Inventors:
Hardin Y. Fisher
Odgar M. Soreng
By Hinkle, Horton, Ahlberg, Hausmann & Wupper
Attorneys.

April 10, 1951
H. Y. FISHER ET AL
2,548,148
MOTOR STARTING CIRCUITS AND RELAY
Filed March 1, 1948
2 Sheets-Sheet 2
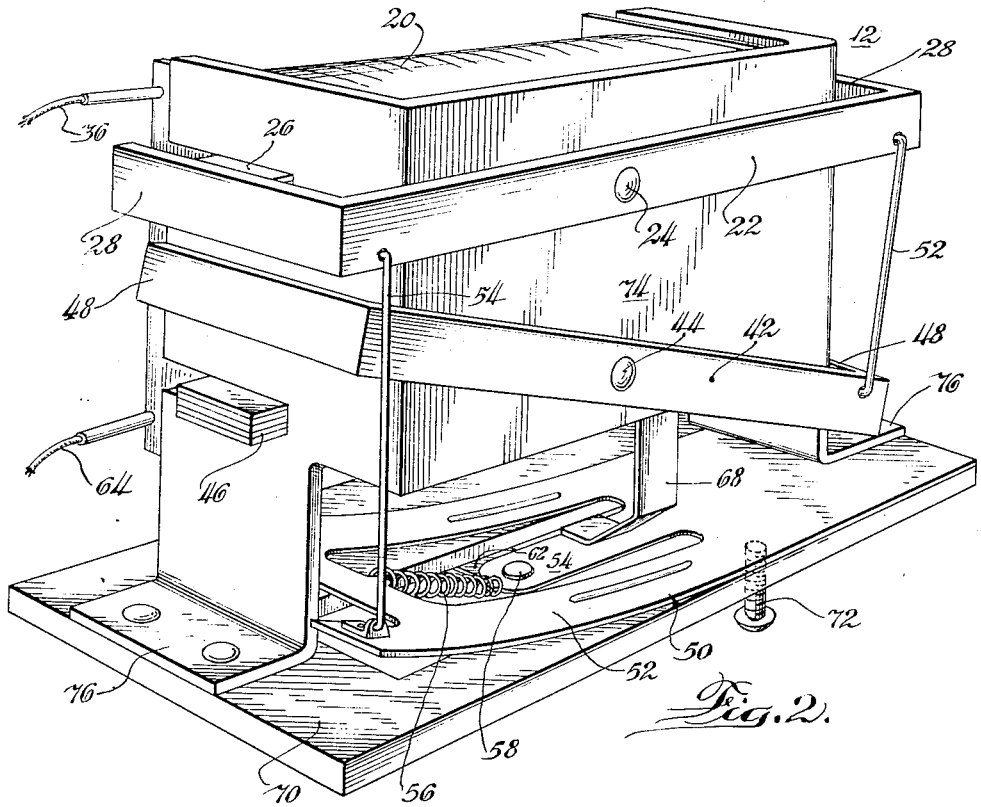
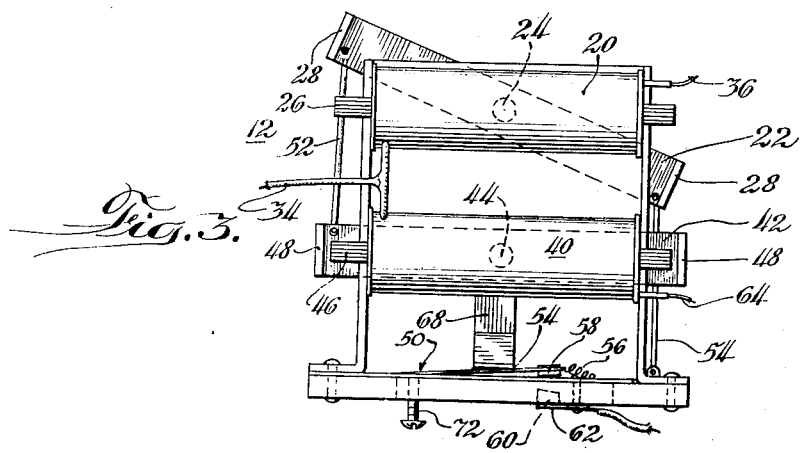
Inventors:
Hardin Y. Fisher
Edgar M. Soreng
By Hinkle, Horton, Ahlberg, Hansmann & Kupper
Attorneys.

Patented Apr. 10, 1951

2,548,148

UNITED STATES PATENT OFFICE

2,548,148

MOTOR STARTING CIRCUITS AND RELAY

Hardin Y. Fisher, Hillside, and Edgar M. Soreng, Skokie, Ill., assignors to Soreng Manufacturing Corporation, Chicago, Ill., a corporation of Illinois Application March 1, 1948, Serial No. 12,396

2 Claims. (Cl. 200—98)

1

The present invention relates to improvements in motor starting circuits and in magnetically operated switches, or starting relays, as they are sometimes called.

In the past it has been customary to control the starting of motors, such as single phase motors having an auxiliary starting winding or phase (usually called split-phase motors), by an external magnetically operated switch or starting relay. They included a single magnet coil which is connected in series with the main or running winding and switch contacts in the auxiliary phase. The switch is open when no current flows in the magnet coil but when the motor is supplied with current, the current drawn by the running winding (at starting the motor is, in effect, in a locked rotor condition) and passing through the magnet coil is sufficient to operate the switch, thereby to close the switch contacts and connect the auxiliary winding to the line. The coil is so constructed and arranged relative to the motor that when the current flow through the running winding decreases, as it does when the motor comes up to speed, to some predetermined low value, the switch contacts open to cut out the starting winding with the result that the motor thereafter operates as a single phase motor with only the running winding energized.

These starting relays should be adjusted, and they usually are adjustable, so that they will close under locked-rotor conditions with low line voltage. They should also be adjusted, if possible, to open when the motor comes up to speed, even when driving a heavy load and over a range of voltages extending from the lowest to the highest likely to be encountered. This, however, is a practical impossibility because if adjusted to close the contacts at low line voltage and at no or a light load, it is well nigh impossible to adjust them to open at high voltage and under load.

The present invention has for its primary object the provision of a new and improved motor starting arrangement and relay which will operate reliably over a considerable range of line voltages.

Another object of the present invention is to provide a new and improved split-phase motor starting arrangement and relay which will connect the starting winding to the line at low line voltages and light loads and which will disconnect the winding when the motor comes up to speed at high line voltages and heavy loads.

A more specific object of the invention is the provision of a new and improved split-phase motor starting arrangement and relay including

2 a pair of mechanically interlocked electromagnetic switch actuating means, one of which is responsive to current flow in the starting winding.

Another object of the present invention is the provision of a new and improved split-phase motor starting arrangement including a normally open starting winding switch and opposed mechanically interlocked starting winding and running winding current responsive electromagnetic starting winding switch operating means.

Other objects and advantages of the present invention will become apparent from the ensuing description of illustrative embodiments thereof, in the course of which reference is had to the accompanying drawings in which:

Fig. 2 is an enlarged perspective view of the motor starting relay during starting of the motor;

Fig. 3 is a reduced side elevational view;

Figure 1:
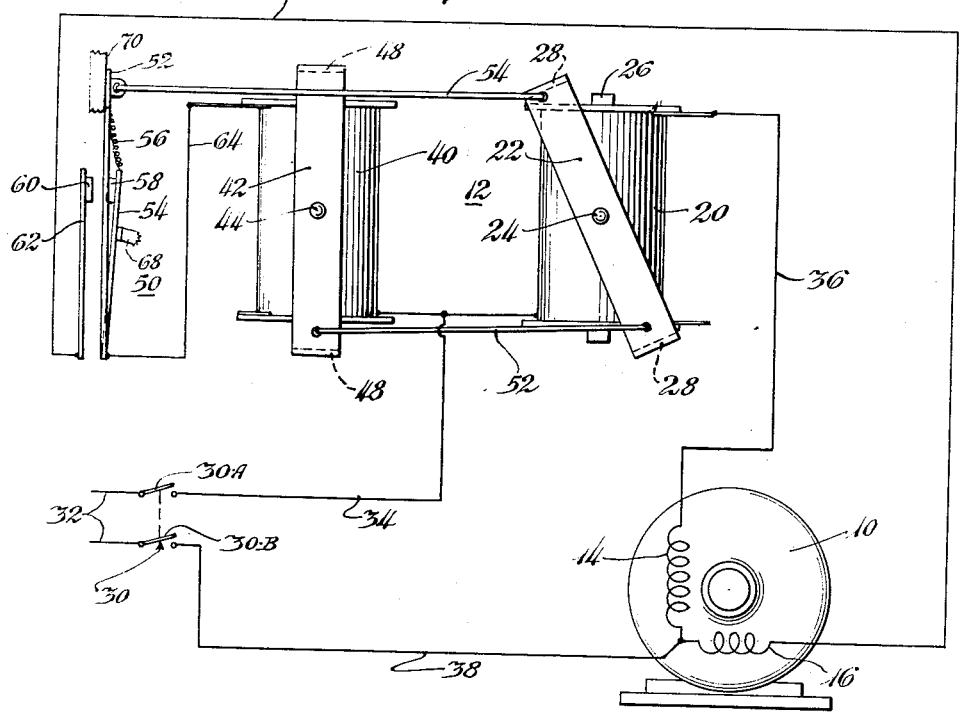
Fig. 1 is a schematic representation of the invention illustrating the circuit and relay at a time when the motor is not operating.

Referring now to the drawings and first particularly to Fig. 1, the split-phase motor starting circuit and relay of the present invention have been illustrated in conjunction with a motor 10, the relay being indicated as a whole by reference character 12. The motor may be of various types, the one illustrated being of a well known type including a main or running winding 14 and an auxiliary or starting winding 16. If desired, the motor could be of the capacitor-, resistor-, or reactor-start type.

The starting relay 12 of the invention is constructed and arranged to control reliably the starting and running of the motor over a wide range of voltages and loads. It is characterized by opposed mechanically interlocked starting winding and running winding current responsive electromagnetic starting winding switch operating means.

The running winding current responsive electromagnetic switch operating means includes a coil 20 adapted to be connected in series with the running winding and a movable armature 22 pivoted at 24 normally displaced from the longitudinal axis of the coil and its associated axial core 26. The core 26 may be made of laminated stock and the armature has generally parallel offset ends 28 projecting beyond the ends of the core, as best illustrated in Fig. 2, to which reference will be had shortly. When current flows through the coil during starting of the motor, the armature 22 is moved clockwise about its pivot 24 and to a position wherein it is substantially in alignment with core 26, as shown in Fig. 2. The current flows through the coil 22 whenever a motor switch 30 is closed, the circuit extending from one supply conductor 32 through switch blade 30—A, conductor 34, coil 22, conductor 36, running winding 14, conductor 38, and switch blade 30—B to the other supply conductor 32.

The starting winding current responsive electromagnetic switch actuating means includes a coil 40 (which may be substantially identical with coil 20) adapted to be connected in series with the starting winding 16 to the supply line during starting of the motor and a movable armature 42 pivoted at 44 normally in alignment with the longitudinal axis of coil 40 and its associated axial core 46. This core likewise may be made of laminated stock and the armature has generally parallel offset ends 48 projecting beyond the ends of the core.

The connection of the series connected starting winding 16 and coil 40 to the power supply lines 32 during starting is effected by a normally open starting winding switch 50 operated by the two electromagnetic actuating means which are effectively opposed and mechanically connected to each other, or interlocked, and to the switch. The interlocking of the armatures is suitably effected, as by a stiff tie rod or wire 52 connected to corresponding ends of the armatures, and a similar connection 54 extends from the opposite end of armature 22 to the switch 50.

The switch 50 is preferably of the over-center snap action type and it is biased to open position, as indicated in Fig. 1, at which time armature 22 is out of alignment with core 26 and armature 42 is in alignment with core 46. During starting, however, because of the greater initial current flow in the running winding, the running winding coil 20 exerts a dominant force and moves its armature 22 to the position shown in Fig. 2 with the result switch 50 is closed and armature 42 is displaced. When the motor speed increases, the current flow through coil 20 decreases to such an extent that pull upon armature 42 and by the biasing means of switch 50 opens the switch and cuts out the starting winding.

The switch 50 may take various forms. It is illustrated as including an outer resilient movable portion 52 connected to tie rod 54 so as to be operated by the actuating means. The movable portion is centrally apertured and has a short tongue 54 extending from its fixed end. The free ends of the movable portion and tongue are connected by an over-center spring 56 tending normally to force the tongue away from portion 52. A contact 58 is mounted on the tongue and associated with it is a stationary contact 60 mounted on terminal 62. The contacts 58 and 60 are in the starting winding circuit and when in engagement they complete a circuit through that winding and coil 42. The circuit extends from switch blade 30—A to switch blade 30—B through conductor 34, coil 40, conductor 64, tongue 54, contact 58, contact 60, terminal 62, conductor 66, the starting winding 16 and conductor 38.

The switch 50 is biased to be normally open by spring 56 and the movable portion 52. The latter is so pre-flexed that it together with spring 56 holds the armatures in the positions shown in Fig. 1. In this position, the position of tongue 54 is determined by an abutment 68 (see Figs. 2 and 3) engageable by it and the position of portion 52 is determined by its engagement with an insulating mounting plate 70. The bias exerted by movable portion 52 is adjustable by screw 72 threaded in plate 70 and engageable with the movable portion.

As far as the physical structure of the relay is concerned, it may take various forms. In the illustrated arrangement, the parts are mounted on the plate 70. The coils and associated cores are mounted between the ends of a generally U-shaped brass support 74 having flanged ends 76 by means of which it is secured to plate 70. The movable armatures 22 and 42 are also secured to the support 74, as is the tongue abutment 68.

The operation of the apparatus of the present invention will now be reviewed briefly. It is assumed that the motor is not operating, the switch 30 being in its open position as illustrated in Fig. 1. At this time the starting winding switch 50 is open and no current flows through coils 20 and 40, with the result that movable armature 22 is displaced from its associated core 26, whereas the armature 42 is in alignment with its core 46.

When it is desired to start the motor the switch 30 is closed. Current flows through the motor running winding and coil 20. The current flow through the coil is sufficient to effect movement of its armature 22 to bring it into substantial alignment with core 26. This effects closure of the starting winding switch 50, the movable portion 52 of which is connected to armature 22 through tie rod 54. At the same time armature 42 is displaced to be out of alignment with its core 46, as illustrated in Fig. 2. When the switch 50 is closed, current flows through coil 40 and the starting winding. The current flowing through coil 40 tends to return armature 42 back to its normal aligned position so that it in effect opposes armature 22.

As the motor comes up to speed, the running winding current flowing through coil 20 decreases relative to the current flowing through coil 40, with the result that the magnetic pull on armature 42 plus the bias of movable portion 52 of the switch finally overcomes the pull on armature 22 and switch 50 opens. It should perhaps be noted that in a split-phase motor the starting winding current decreases as the motor comes up to speed but it does not decrease as much as the running winding current so that the net effect is that armature 42 and the bias of movable portion 52 of the switch overcome the pull of armature 42. In capacitor start split-phase motors, the starting winding current increases during the starting winding operation, whereas the running current decreases.

As a result of the mechanical interlocking and opposed effects of the two coils, the relay is compensated for variations in line voltage. The line voltage variations are effectively canceled because during the starting operation both of the coils are connected to the line and because they act in opposition.

The current at which the switch 50 is closed and the starting winding cut-in is adjustable by the screw 72. When the screw is moved inwardly, it decreases the bias exerted by the portion 52 of the leaf spring, with the result that movable armature 22 is moved to close the switch at a lower running winding current.

Figures 4, 5:
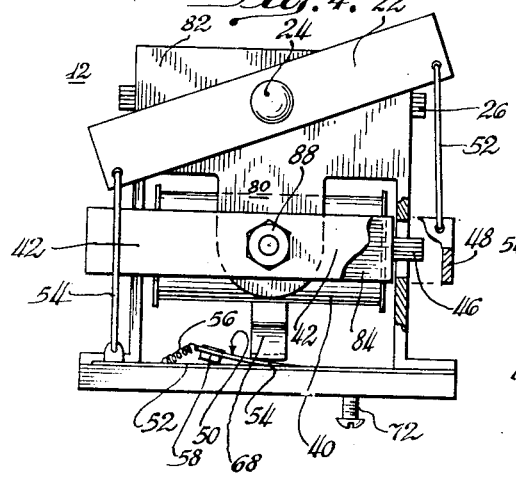
Fig. 4 is a side elevational view of a modified embodiment, a portion of which is broken away better to illustrate certain details of construction.
Fig. 5 is an end view, partly broken away, of the embodiment of Fig. 4.

In order that the same relay may be used for different sized motors, it is desirable also to have an adjustment for cutting out the starting winding. A relay of this character is illustrated in Figs. 4 and 5. The adjustment of the cutting out of the starting winding is effected by angular movement of the starting winding coil 40 and its associated core 46 relative to the armature 42. Thus, variation of the position of the coil and core relative to the armature 42 varies the pull of armature 42 with the result that the relay can be adjusted to cut out the starting winding at desired current values.

In this embodiment of the invention, the armature 42 is pivotally mounted upon a tongue-like portion 80 of a support 82 corresponding generally to the support 74. The coil 40 and its core 46 are mounted upon a narrow generally U-shaped bracket 84. The bracket is adapted to be secured in adjusted angular position on tongue 80 by means of a screw 86 and nut 88. The nut 88 is spaced from the tongue 80 by a spacer 90 so that when the nut is tightened the coil supporting bracket 84 is tightly held in place. The spacer extends through the armature 42 and permits the latter to move pivotally.

The operation of the embodiment of Figs. 4 and 5 is the same as that previously described except that it contains, as already indicated, provision for the adjustment of both the cutting in and cutting out of the starting winding. Also, as indicated, the advantage of this construction is that the same relay can be readily adjusted or calibrated for use with a number of different sized motors.

While the present invention has been described in connection with the details of two embodiments thereof, it should be understood that these details are not intended to be limitative of the invention, except in so far as set forth in the accompanying claims.

Having thus described our invention, what we claim as new and desire to secure by Letters Patent of the United States is:

1. A split-phase motor starting relay including a mounting plate, a relatively stationary switch contact on said mounting plate, a support mounted on said plate, a pair of coils having axially extending cores mounted on said support, armatures associated with each of said coils and cores pivotally mounted upon said support, means connecting adjacent ends of said armatures so that one armature is in alignment with its coil and core and the other one is out of alignment with its associated coil and core, a movable switch contact mounted on said plate, and means operatively connecting said interconnected armatures to said movable contact.

2. A split-phase motor starting relay including a mounting plate, a relatively stationary switch contact on said mounting plate, a generally U-shaped support mounted on said plate, a pair of coils having axially extending cores mounted on said support, the ends of said cores extending outwardly beyond the parallel sides of said U-shaped support, armatures associated with each of said coils and cores, means pivotally mounting said armatures upon the transverse portion of said U-shaped support, means connecting adjacent ends of said armatures so that one armature is in alignment with its coil and core and the other one is out of alignment with its associated coil and core, a movable switch contact mounted on said plate, and means operatively connecting said interconnected armatures to said movable contact.

HARDIN Y. FISHER.
EDGAR M. SORENG.

REFERENCES CITED

The following references are of record in the file of this patent:

UNITED STATES PATENTS

| Number | Name | Date |
|---|---|---|
| 717,497 | Cuenod | Dec. 30, 1902 |
| 934,391 | Conrad | Sept. 14, 1909 |
| 1,690,187 | Zumbo et al. | Nov. 6, 1928 |
| 1,921,127 | Hutt | Aug. 8, 1933 |
| 1,921,204 | Nickle | Aug. 8, 1933 |
| 1,991,036 | Werner | Feb. 12, 1935 |
| 2,021,199 | Pearce | Nov. 19, 1935 |
| 2,235,537 | Schaefer | Mar. 18, 1941 |

FOREIGN PATENTS

| Number | Country | Date |
|---|---|---|
| 845,757 | France | May 22, 1939 |